(12) United States Patent
Aminzadeh et al.

(10) Patent No.: US 6,236,943 B1
(45) Date of Patent: May 22, 2001

(54) HYBRID RESERVOIR CHARACTERIZATION METHOD

(75) Inventors: Fred Aminzadeh; Wenlong Xu, both of Sugar Land, TX (US)

(73) Assignee: Union Oil Company of California, El Segundo, CA (US)

( * ) Notice: Subject to any disclaimer, the term of this patent is extended or adjusted under 35 U.S.C. 154(b) by 0 days.

(21) Appl. No.: 09/247,788

(22) Filed: Feb. 9, 1999

(51) Int. Cl.[7] .................................................. G06F 19/00
(52) U.S. Cl. ................................................ 702/16; 702/14
(58) Field of Search .......................... 702/16, 14; 367/68, 367/73

(56) References Cited

U.S. PATENT DOCUMENTS

| | | | |
|---|---|---|---|
| 4,316,268 | 2/1982 | Ostrander | 367/68 |
| 4,415,999 | 11/1983 | Moeckel et al. | 367/73 |
| 4,953,140 | 8/1990 | Dablain | 367/73 |
| 5,079,749 | 1/1992 | Aminzadeh et al. | 367/73 |
| 5,539,704 | * 7/1996 | Doyen et al. | 367/73 |

(List continued on next page.)

OTHER PUBLICATIONS

Aminzadeh, F. et al., "Applcations of Clustering in Exploration Seismology," Geoexpoaration, 23 (1984/85), pp. 147–159.

Aminzadeh, F., "Applications of Fuzzy Experts Systems in Integrated Oil Exploration," Computers Elect. Engng. Vol. 20, No. 2, pp. 89–97, 1994.

Ki Young Kim et al., "Effects of Transverse Isotropy on P–wave AVO for Gas Sands," Geophysics, Vol. 58, No. 6, (Jun. 1993), pp. 883–888.

Patnaik, Gagan et al., "Neural Computing for Reservoir Parameter Estimation," IUGG Convention, 1995, Boulder, Colorado.

Snydsman, William E. et al., "Pattern Recognition in Geophysical Exploration," SPIE Vol. 768, pp. 53–60, 1987.

Aminzadeh, F. et al., "Adaptive Neural Nets for Generation of Artificial Earthquake Precursors," IEEE Trans. On Geoscience and Remote Sensing, Vol. 32, No. 6, pp. 1139–1143, Nov. 1994.

Aminzadeh, F. et al., "Expert Systems in Exploration," Geophysical Development Series, Vol. 3, Society of Exploration Geophysicists, pp. 1–32, 1991.

Castagna, J. P. et al., "Rock Physics—The Link Between Rock Properties and AVO Response," Mem. 8, pp. 135–171, 1993.

Lefeuvre, F. et al., "Sand–Shale Ratio and Sandy Reservoir Properties Estimation From Seismic Attributes: An Integrated Study," Extended Abstracts, 65th Annual Intl. Mt., Soc. of Exploration Geophysicists, Houston, pp. 108–110, 1995.

Rüeger, A. et al., "Azimuthal Variation of AVO Response for Fractures Reservoirs," Extended Abstracts, 65th Annual Intl. Mtg., Soc. of Exploration Geophysicists, Houston, pp. 1103–1106, 1995.

(List continued on next page.)

*Primary Examiner*—Jay Patidar
*Assistant Examiner*—Victor J. Taylor
(74) *Attorney, Agent, or Firm*—William O. Jacobson; Gregory F. Wirzbicki

(57) ABSTRACT

An integrated physical and statistical method provides predictions of a reservoir property by operating on seismic data both before and after it is significantly enhanced, e.g., stacked/filtered. One or more matrix functions are derived from pre-stacked, partially-stacked, and/or post-stacked seismic data that are used to obtain a new attribute as well as to correlate/integrate the physical and statistical methods to obtain significantly improved predictions of a reservoir property.

19 Claims, 4 Drawing Sheets

U.S. PATENT DOCUMENTS 5,675,147 * 10/1997 Ekstrom et al. ............... 250/256
5,706,194 * 1/1998 Neff et al. ..................... 364/421
5,995,907 * 11/1999 Van Bemmel et al. ......... 702/16

OTHER PUBLICATIONS

Rolla M. "Azimuthal AVO Analysis," Joffre Field, Alberta, Canada extended Abstracts 65$^{th}$ Annual Intl. Mtg. Soc. of Exploration Geophysicists, Houston, pp. 1107–1110, 1995.

Shapiro, S.A. et al., "Seismic Wave Reflectivity/Transmissivity for randomly–Layered Nonstationary Sediments," Ext. Abst. 65$^{th}$ Annual Intl. Mtg., soc. of Expl. Geophysicists, Houston, pp. 1305–1308, 1995.

Taner, M. T. et al., "Complex Seismic Trace Analysis," Geophysics, Vol. 44, No. 6, pp. 1041–1063, 1979.

Verm, R.W. et al., "Lithology Color–Coded Seismic Sections The Calibration of AVO Crossploting To Rock Properties," The Leading Edge of Geophysics, pp. 847–853, 1995.

Aminzadeh, F. et al., "Normal Incidence Layered System State–Space Models Which Include Absorption Effects," Geophysics, No. 3, pp. 259–271, Mar. 1983.

Aminzadeh, F. et al., "Non–Normal Incidence State–Space Model and Line Source Reflection Synthetic Seismogram," Geophysical Prospecting 30, pp. 541–568, 1982.

"Solid Seismic Elastic Modeling," Geophysical Development Corporation, Houston, Texas, 4 page brochure.

Masanao Aoki, "State Spacing Modeling of Time Series," 2 The Notion of State, pp. 3–8.

Meadows, Mark et al., "Exact Inversion of Plane–Layered Isotropic and Anisotropic Elastic Media by the State–Space Approach," Geophysics Vol. 51, No. 11, pp. 2301–2050, Nov. 1986.

Fuchs, Jean–Jacques, "State–Space Modeling and Estimation of Time Differences of Arrival.," IEEE Tansactions on Acoustics, Speech, and Signal Processing, Vol. ASSP–34, No. 2, pp. 232–244, Apr. 1986.

"Sierra Geophysics Exploration Software," VESPA™ Viscoelastic Seismic Profile Algorithm, 3 page brochure.

Xu, Wenlong, et al., "Integrating Seismic Data in Reservoir Modeling: The Collocated Cokriging Alternative," SPE 24742, pp. 833–842, 1992.

Bain, Z. et al., "The Application of Pattern Recognition To Seismic Signal Interpretation," Advances in Geophysical Data Processing, Vol. 3, pp. 175–199, 1989.

Ostranger, W. J., "Plane–Wave Reflection Coefficients for Gas Sands at Nonnormal Angles of Incidence," Geophysics, Vol. 49, No. 10, pp. 1637–1648, Oct. 1984.

Lashgari, Bijan "Fuzzy Classification With Applications to Geophysical Data," Geophysical Development No. 3, Expert Systems in Exploration, Edited by Fred Aminzadeh and Marvin Simron, Society of Exploration of Exploration Geophysics, pp. 161–178, 1991.

Sinvhal, Amita et al., "Application of Seismic Reflection Data to Discriminate Subsurface Lithostratigraphy," Geophysics, Vol. 48, No. 11, pp. 187–224, Nov. 1983.

Schuelke, J. S. et al., "Reservoir Architecture and Porosity Distribution, Pegasus Field, West Texas—an Integrated Sequence Stratigraphic—Seismic Attribute Study Using Neural Networks," In Proceedings of SEG/Dallas 1997, Society of Exploration Geophysics, 76$^{th}$ Annual Meeting, Nov. 2–7, 1997, pp. 668–671.

Sinvhal, A. et al., "Seismic Indicators of Statigraphy," In Pattern Recognition and Image Processing, Geophysical Press, Vol. 49, No. 8, pp. 225–262, 1987.

Sheriff & Geldart, "Exploration Seismology," Cambridge Press, Vol. 1, pp. 52–57, 1982.

Sheriff & Geldart, "Exploration Seismology," Cambridge Press, Vol. 2, pp. 140–143, 1983.

* cited by examiner $$TCM = \begin{pmatrix} 0 & \Delta t_{12} & \Delta t_{13} & \Delta t_{14} & \cdots & \Delta t_{1N} \\ \Delta t_{21} & 0 & \Delta t_{23} & \Delta t_{24} & & \Delta t_{2N} \\ \vdots & \vdots & \vdots & \vdots & & \vdots \\ \Delta t_{N1} & \Delta t_{N2} & \Delta t_{N3} & \Delta t_{N4} & & 0 \end{pmatrix}$$

*FIG. 3a.*

$$PCM = \begin{pmatrix} P_{11} & P_{12} & P_{13} & P_{14} & \cdots & P_{1N} \\ P_{21} & P_{22} & P_{23} & P_{24} & & P_{2N} \\ \vdots & \vdots & \vdots & \vdots & & \vdots \\ P_{N1} & P_{N2} & P_{N3} & P_{N4} & & P_{NN} \end{pmatrix}$$

*FIG. 3b.*

$$PSTCM = \begin{pmatrix} 0 & \Delta t_{NM} & \Delta t_{NF} \\ \Delta t_{MN} & 0 & \Delta t_{MF} \\ \Delta t_{FN} & \Delta t_{FM} & 0 \end{pmatrix}$$

*FIG. 3c.*

$$PSPCM = \begin{pmatrix} P_{NN} & P_{NM} & P_{NF} \\ P_{MN} & P_{MM} & P_{MF} \\ P_{FN} & P_{FM} & P_{FF} \end{pmatrix}$$

*FIG. 3d.*

HYBRID RESERVOIR CHARACTERIZATION METHOD

FIELD OF THE INVENTION

This invention relates to data attributes and pattern recognition methods in data mining and analysis. More specifically, the invention is concerned with providing a method of analyzing patterns in one or more seismic signal attributes related to one or more properties of an underground reservoir.

BACKGROUND OF THE INVENTION

Analyzing and extracting the most information from indirect measurements of a property of matter, such as a subsurface formation or structure that might contain a natural resource, has long been an important goal for natural resource identification and recovery activities. For example, the information can be used to provide predictions of one or more structural and rock properties of a potential reservoir and enable the economic recovery of oil from the reservoir. One type of indirect measurement uses a compressional wave generator or other seismic source of seismic waves and a plurality of seismic transducers or sensors generating seismic data that represent the sensed seismic wave or disturbance. The generated wave is typically affected by at least one property of an underground formation of interest and the resulting sensed signals have long been used to predict at least one structural or lithological boundary location and other properties, referred to herein as a Primary Reservoir Property (PRP).

In a typical seismic analysis application, a firing or actuation of a seismic source (e.g., an airgun, explosive charge, or vibration device) generates one or more types of seismic waves such that the waves reach the formation of interest. A plurality of seismic sensors is located so as to be influenced by the subsurface seismic waves after they reach the formation of interest and produce seismic data. The seismic data are typically comprised of events resulting from reflections of the seismic waves from formation boundaries, such as shale breaks or fault lines. The locations of the reflecting boundaries can be determined from an analysis of the attributes of the seismic data. For example, measuring the time delay from the firing source to the first detection of the reflected signal gives some indication of the distance traveled using an estimate of the speed of the underground seismic wave. The speed of the seismic wave through different formations is typically estimated or determined from other available information.

In order to predict other formation or reservoir properties, different methods are used to determine a relationship between one or more attributes of the measured seismic signals and the reservoir property. Two methods typically used are categorized as a physical method (PM) and a statistical method (SM). A physical method (PM) seeks to correlate one or more formation properties with seismic or other indirect measurements based on physics or other known physical relationships. An example of a physical method is the bright spot analysis technique linking the amplitude responses of stacked seismic data to the presence of hydrocarbons in the formation, e.g., see Exploration Seismology, Sheriff and Geldart, Cambridge Press, Vol. 1, 1982 and Vol. 2, 1983. Another example of a physical method of analyzing seismic data is a conventional AVO analysis that under certain conditions can be related to the behavior of seismic amplitude as a function of offset to lithology and/or fluid properties of the reservoir using Biot-Gassman theory, e.g., see Plane Wave Reflection Coefficients for Gas Sands at Non-Normal Angles of Incidence, Ostrander, Geophysics, Vol. 49, No. 10, 1984, pp. 1637–1647.

Other analysis methods, such as statistical methods (SM), are also used since not all physical effects of various formation properties on seismic signals or other indirect measurements are known. One conventional statistical method is based on correlating an unknown property and a seismic signal attribute using more direct measurements of the property at one or more specific locations, such as well log data. Conventional linear statistical methods are used to develop a correlation for other locations, including regression analysis (e.g., see "The Application of Pattern Recognition in Seismic Signal Interpretation," Z. Bian, Y. Li, P. Yan, and T. Chang, in Advances in Geophysical Data Processing, Vol. 3. entitled Artificial Intelligence and Expert Systems in Petroleum Exploration, M. Smaan & F. Aminzadeh editors, JAI Press, 1989, pp. 175–199), clustering (e.g., see "Application of Clustering in Exploration Seismology," F. Aminzadeh and S. L. Chatterjee, Geoexploration, Vol. 23, 1984, pp. 147–159), linear discriminent analysis (e.g., see "Seismic Indicators of Stratigraphy," A. Sinhal, K. N. Khattri, H. Sinvhahal, and A. K. Awasthi, in Pattern Recognition and Image Processing, Geophysical Press, 1987, pp. 225–262), and cokriging (e.g., see "Integrating Seismic Data in Reservoir Modeling, the Colocated Cokriging Alternative," W. Xu, T. T. Tran, R. M. Srivastava, and A. G. Journal, SPE Paper #24742, 1992). Examples of non-linear statistical analysis methods include neural networks (e.g., see "Reservoir Architecture and Porosity Distribution, Pegasus Field, West Texas, an Integrated Sequence Stratigraphic Seismic Attribute Study Using Neural Networks," J. S. Schuelke, et. al., in the Proceedings of the Society of Exploration Geophysicists Meeting, Dallas, 1977, pp. 668–671), fuzzy logic techniques (e.g., see "Fuzzy Classification with Application to Geophysical Data," by B. Lashgari, in Expert Systems in Exploration, F. Aminzadeh and M. Sinaan, Editors, SEG Press, 1991, pp. 161–178, "Applications of Fuzzy Expert Systems in Integrated Oil Exploration," F. Aminzadeh, Computers and Electrical Engineering, Pergamon Press, 1994, pp. 89–97, and "Applications of Fuzzy Expert Systems in Integrated Oil Exploration," F. Aminzadeh, Soft Computing, Prentice Hall, 1994, pp. 29–43), and generic algorithms that try to identify correlations where there is no well defined or well known relationship between one or more seismic attributes and one or more formation properties. Besides log data from wells penetrating the formation of interest at a known location, signal-correlatable formation properties can also be derived from other sources including laboratory or scaled down physical models of the reservoir, measurements and analysis of core samples, or well log data from similar formations or nearby locations.

Both physical and statistical methods have been successfully used to accurately predict at least one primary reservoir property (PRP) in environments such as a shallow reservoir, but have experienced problems when applied to seismic data for complex underground environments. A complex environment is defined herein as having one or more of the following characteristics: a reservoir that is deeper than about 10,000 feet and more especially a reservoir that is deeper than about 15,000 feet, a reservoir having a near surface weathering layer more than 500 feet thick, a reservoir having a shallow gas layer over 200 feet thick, seismic data having a low signal to noise ratio, and data having multiple reflections and/or static problems. A very complex environment is defined herein as having two or more of the above-mentioned characteristics, and an extremely complex environment is defined herein as having three or more of the above-mentioned characteristics. Other conventional seismic attributes may be used to predict a PRP in some complex environments, such as frequency and AVO, but accurate predictions using seismic attributes in very complex environments and extremely complex environments have been a problem.

More recently, seismic data have been used to predict other unknown or inaccurately known properties of a potential fluid-containing reservoir, each referred to as a secondary reservoir property (SRP), e.g., formation fluid saturation, porosity, and pore pressure. These SRP predictions are especially desirable when direct measurements are very costly, e.g., predicting the fluid-related properties of an offshore underground formation that may contain hydrocarbons. Prediction of a SRP has been attempted by recognizing other patterns or using other, less obvious attributes and characteristics of a seismic signal. Because at least one PRP from complex environments or a SRP may cause rather small changes in some characteristics of the seismic signal (including amplitude, frequency, and phase), various data enhancement techniques are used. For example, filtering and pre-processing of the raw data is used to create pre-stack data. Time shifting and combining the pre-stack data creates enhanced or post-stack data that is used in a PM or a SM to analyze the data for a PRP or SRP.

A conventional PM analysis of seismic data for at least one SRP generates a visco-elastic model, followed by calculating one or more seismic attributes using the model. Similar attributes are then calculated from the field seismic data. Attributes calculated from field and model data are compared and the comparison used to evaluate the accuracy of SRP predictions qualitatively. Post-stack (enhanced) data attributes from the seismic field data and other data or parameters are correlated to the model and used to predict at least one SRP. The results can be used to modify or update the visco-elastic model and/or parameters, followed by one or more iterations on the model and/or parameters. A corresponding statistical method (SM) analysis uses a more accurately predicted or directly measured SRP (referred to as "known" property, e.g., a property measurement from well log data or other well information) to correlate the field seismic data attributes to the well information. But no matter whether a PM or a SM is used, significant uncertainty remains for one or more SRP and PRP, especially in complex environments.

More recently, methods of analyzing enhanced data that compare physical and statistical methods (PM & SM) have been published. For example, see "Sand-Shale Ratio and Sandy Reservoir Properties from Seismic Attributes: an Integrated Study" by Lefeuvre, Wrolstad and Zou, 65th Annual International Meeting, Society of Exploration Geophysicists, Houston, 1995, pages 108–110. However, significant uncertainties still remain for predicted reservoir properties, especially for an SRP in a complex or very complex environment.

SUMMARY OF THE INVENTION

The present invention provides an integrated physical and statistical analysis method to predict one or more reservoir properties. The preferred analysis method requires pre-stack and/or post-stack data. In one embodiment, one or more matrix functions are derived from partially-stacked seismic data used to obtain a new set of seismic data attributes as well as to correlate/integrate initial predictions based on physical and statistical methods, obtaining significantly improved predictions of both PRP and SRP.

The inventive integration of initial physical and statistical analysis predictions also allows an analyst to assess the reliability of each initial method. For example, if a PM analysis indicates a correlation and a SM does not, this in itself provides the analyst with information on the methods, data, and reservoir properties and suggests further examination of the underlying statistics and/or physics.

BRIEF DESCRIPTION OF THE DRAWINGS

FIGS. 3a, 3b, 3c, and 3d show attributes within a window corresponding to an event of interest, a TCM, a PCM, and partially-stacked matrices.

In these Figures, it is to be understood that like reference numerals refer to like elements or features.

DETAILED DESCRIPTION OF THE INVENTION

The inventive analysis method initially uses selected conventional data collection and several types of analysis methods, but couples the conventional methods with an inventive correlation and/or iterations to create a hybrid method for predicting at least one primary resource property (PRP) or secondary resource property (SRP). For example, initial SM and PM predictions of a SRP within a formation or zone are matrix correlated to yield a single prediction method for the SRP within a zone of interest. The singularly predicted results at selected points within the zone are compared with measured or high confidence 2-D or 3-D elastic physical modeling results, allowing a further evaluation of the extent of uncertainty and/or validity of the initial predictions and the singularly predicted results, allowing further iteration/correction of the predicted results. Corrective iteration of a SRP may be preceded by corrective iteration of a PRP.

Figure 1:
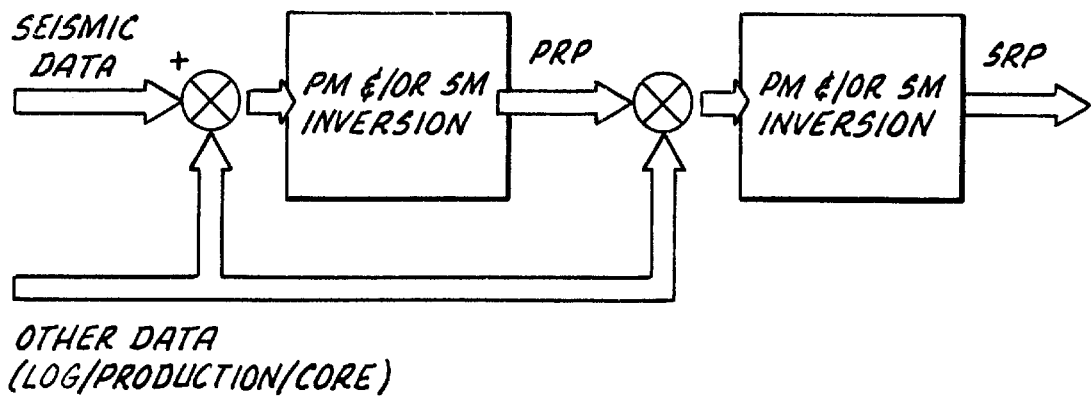
FIG. 1 shows an inventive sequence for correlating predictions of primary reservoir properties and secondary reservoir properties.

FIG. 1 is a process flow diagram of one embodiment of the inventive method. Using pre-, partial-, and/or post-stack seismic data combined with two or more different predictive methods and/or measured property data, one can derive an integrated prediction of a primary reservoir property (PRP). The multiple predictions are inverted and/or correlated to obtain an integrated prediction of the PRP having reduced uncertainty. The single point or integrated PRP predictions at selected locations, such as at measured or otherwise "known" points, are compared to the "known" data and the inversion/correlation process repeated, if necessary, resulting in iterated predictions of a PRP having still further reduced uncertainty.

The resulting iterated predictions of a PRP are used with a PM and a SM to produce initial integrated/iterated PRP predictions. The PRP predictions are then similarly correlated to produce a SRP prediction using later described weighting and/or correlation methods. The single point prediction for a SRP at any one location can also be compared to "known" property data (e.g., measured data) at selected locations and the process iterated as necessary.

The inventive correlation and/or iterative method also provides a tool to detect a previously undetected correlation in an attribute of a seismic signal to a reservoir property and use the correlation to more accurately predict one or more properties of a formation. For example, in addition to the travel time of the stacked seismic signal, spatial seismic phase/frequency attributes can be subtly affected by changes in some primary reservoir properties. By correlating one or more of these properties at different locations to changes in spatial or other attributes, an improved accuracy of prediction (over that achievable using just travel time of a stacked signal) of a property is possible.

Some other attributes may be so subtly affected that a still more sophisticated analysis method is required, e.g., calculating a cross-correlation matrix function of pre-stacked seismic data with a SRP. This method may be of additional significance when conventional methods fail, e.g., due to complex environments, more especially very complex or extremely complex environments.

Figure 2:
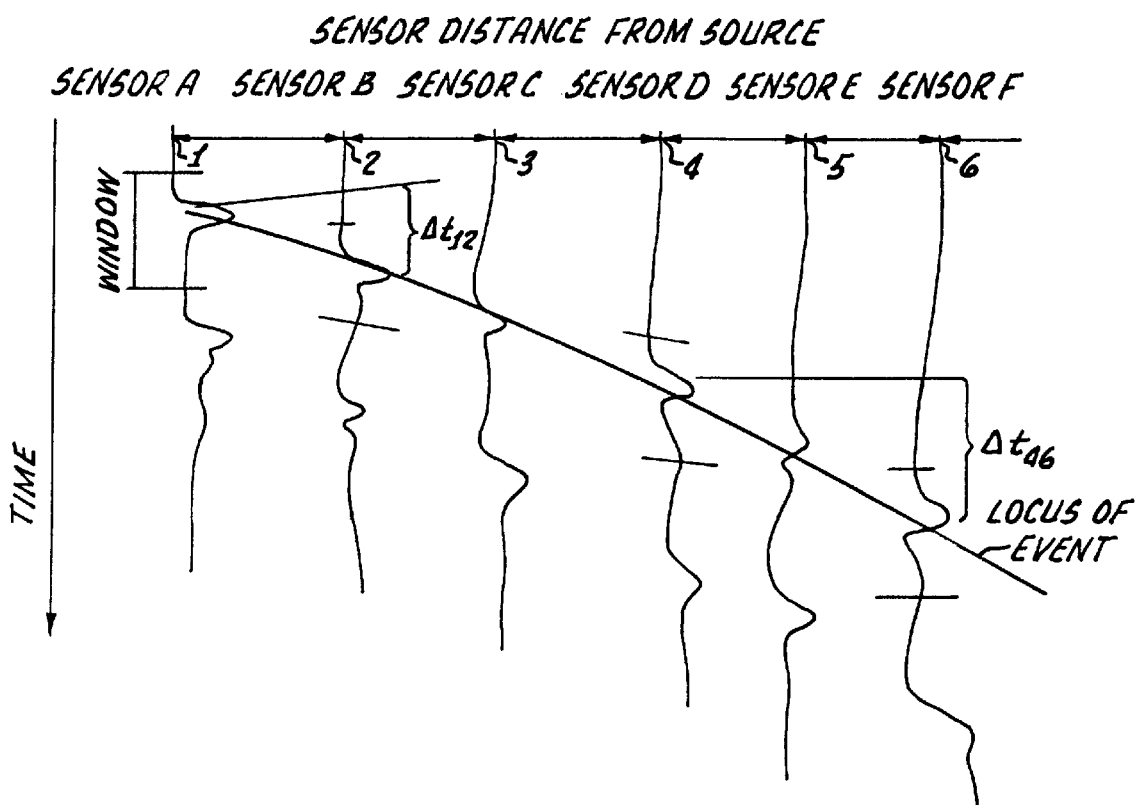
FIG. 2 shows a typical seismic CDP gather.

For the still more sophisticated analysis, two types of cross-correlation matrix functions are defined herein: a time-cross correlation matrix (TCM) function and a power-cross correlation matrix (PCM) function. A TCM function is comprised of a set of travel time delays between successive traces for a given data window corresponding to an undefined (or uncertain) event or attribute change on common-depth-point (CDP) gathers. Successive time-traces are illustrated in FIG. 2. PCM and TCM functions are illustrated in FIGS. 3a through 3d.

The power-cross correlation matrix (PCM) function corresponds to a power function derived from correlating amplitudes in a given data window on successive traces measured by adjoining sensors. As an example, if adjoining traces have approximately constant amplitudes of 6 and 8 at a common event across the entire window, a power matrix point of 48 would be calculated. An example of a PCM is illustrated in FIG. 3b.

Although signal strength or amplitude time traces are the attribute illustrated in FIG. 2, other attributes can be used to develop TCM's and PCM's including amplitudes for a given frequency spectrum and phase reversals. In alternative embodiments, other arrangements of traces can be used to develop a matrix instead of differences between successive traces. Other arrangements can include data signals from one or more sensors detecting different wave types and azimuth information.

In an alternative embodiment, partial-stacking of the data is used to reduce the dimensions of TCM and PCM. Partial-stacking creates subgroups of the original seismic traces or data, e.g., a subgroup of data from sensors within a certain distance from the seimic generator or source, such as partial-stacks of data from sensors located at near, mid-range and far distances from the source. The selected seismic data set within each subgroup forms a basis for generating partial-stack matrices PSTCM and PSPCM. The reduced size or dimensions of a partial-stack matrix can minimize analysis costs without a significant loss of spatial or other attribute information.

An example of partial-stacking and calculated TCM and PCM functions using partial-stack data is shown in FIGS. 3c and 3d. The near (N), mid (M), and far (F) partial-stack calculations given in FIGS. 3c and 3d refer to partially-stacking a first set of seismic data from sensors near the source signal (e.g., stacking data from the nearest ⅓ of seismic sensor locations), a second set from mid range sensor locations (e.g., the second ⅓ of sensor locations), and a third from distant sensors from the source signal (e.g., the last ⅓ of sensor locations). This partial-stacking produces a comparatively small 3 by 3 matrix that can be analyzed at reduced cost while retaining spatial and other attribute information.

FIGS. 3a, 3b, 3c, and 3d show an example of seismic data attributes and related analysis methods. The data typically result from a string of transducers or sensors detecting seismic waves or disturbances resulting from actuating a source generator, such as a pneumatic actuator or explosive device. The source disturbance may be omnidirectional or it may be focused towards an underground region of interest where the transducers may be located to detect transmitted or reflected seismic waves from the region of interest. Although different types of signals (e.g., electrical or pneumatic signals) from various seismic transducers can be used (e.g., surface compressional wave detectors, shear wave detectors, or downhole acoustic detectors), electrical data or time-trace signals from a plurality of surface mounted, spaced-apart compressional wave sensors or transducers are represented in FIG. 2. These sensors or measurement devices may only detect vertical movements, but two component or three (X, Y, & Z) component directional data may also be used. The sensed seismic signals are typically transmitted from on-shore sensors to a data collector and analyzer that is truck mounted and ship or platform mounted for offshore seismic surveys. In alternative embodiments, other indirect indicators of properties can be used instead of seismic data.

In FIG. 2, an amplitude signal peak or event is identified in a time trace from sensor A and time differences $\Delta t$ are calculated between traces from different sensors. For example, $\Delta t_{12}$ is the measure time between when the amplitude peak appears in trace A and trace B. Similarly, $\Delta t_{46}$ is the time difference of the amplitude peak appearing on traces D and F. Although the locations of the sensor may be equidistant as shown, the locations may have many other spacing arrangements.

A time correlation matrix (TCM) of individual time trace differences (See $\Delta t_{46}$ as illustrated in FIG. 2) is shown in FIG. 3a. A comparable power correlation matrix (PCM) of differential power functions derived from the time traces is shown in FIG. 3b. Individual elements of these matrices use differences between traces at comparable amplitude peaks, the TCM uses differences in time, and the PCM uses the correlation between the amplitudes of different traces within a given window. Similar matrix functions can be developed for other seismic data attributes such as spatial differences, phase rotation, and a measure of wavelet character changes of adjacent traces.

FIG. 3c illustrates a partial TCM and FIG. 3d illustrates a partial PCM. Instead of a matrix of time and power differences between individual traces, such as those illustrated in FIG. 2, the time and power differences between stacked subgroups of traces are used, e.g., the partial-stacking of traces 1 & 2 comprising the near subgroup, traces 3 & 4 comprising the middle subgroup, and traces 5 & 6 comprising the far subgroup.

Figure 4:
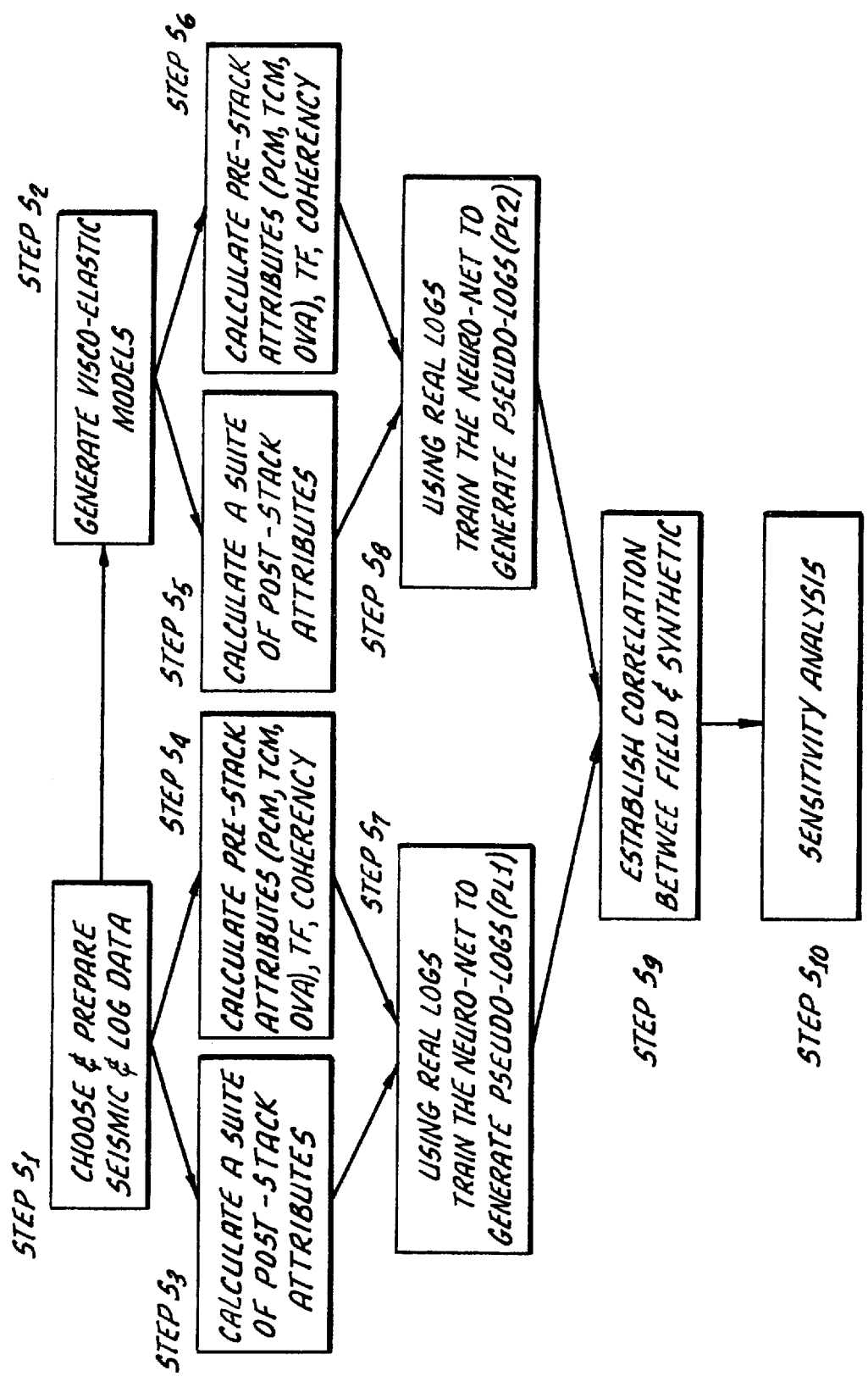
FIG. 4 shows a process flow diagram of a correlative embodiment of the inventive method.

FIG. 4 shows a process flow diagram for an embodiment of the inventive method that predicts one or more properties of an underground structure or formation using seismic data. The inventive method does not exclude conventional post-stack or enhanced data analysis, but provides another way of obtaining a more reliable prediction of formation properties that can be used separately or in conjunction with conventional data analysis techniques. In the process illustrated in FIG. 4, the inventive method is used in conjunction with conventional post-stack analysis methods that provide initial predictions of formation properties.

Step S1 prepares seismic and log data. This can include stacking, partial-stacking or other data enhancement techniques. The location of any log data is correlated to the locations of the seismic sensors and distances between these locations calculated. Other data selection and/or preparation activities can include editing, calibration, squeezing, and stretching.

Step S2 generates a visco-elastic or other analytical model of the reservoir based upon physical relationships. The model can be as simple as assuming a homogeneous composition of matter at all underground locations with an associated isometric speed of seismic waves or as complex as dramatically different compositions of many irregular lithographic structures at a location in a complex environment superimposed on various faults, fluid motions, and fluid traps with the associated effects on various seismic attributes. Other examples of analytical models based on physics can be found in U.S. Pat. No. 5,079,749 and "Rock Physics-The Link Between Rock Properties and AVO Response," J. P. Castagna K. H. Batzle, and T. K. Kan, SEG, Mem. 8, 1993.

Step S3 initially identifies or calculates one or more post-stack attributes of the seismic data that might be influenced by a PRP or SRP and show a measurable shift in the post-stack attribute. A post-stack attribute may include sensed signal amplitude, phase, polarization, frequency spectrum, and absorption (Q) factor. The event identification or calculation may be based on observed changes in seismic data, interpolations between well log property data and/or lithographic outcroppings, subsurface and a real projections of measured altitude, temperature and/or compositional changes at the surface, and projections of measured seismic activity/fault lines. Examples of a suite of post-stack attributes calculated or identified include instantaneous amplitude, phase and frequency. (See, for example, "Complex Seismic Trace Analysis", M. T. Taner, F. Kohler, and R. E. Sheriff, Geophyisics, Vol. 44, 1979, pp. 1041–1063.)

Step S4 identifies or calculates one or more pre-stack (or partial-stack) attributes of the seismic data which may be similar to the attributes identified in step S3. Because of the spatial character of pre- or partial-stack data, attributes may include matrix functions such as PCM and TCM, or other functions such as QVA, variations of absorption with offset, or various other measures of dissimilarity or coherency. Another example of a suite of pre- or partial-stack attributes calculated or identified is amplitude variation with offset.

Steps S5 and S6 similarly identify and/or calculate post and pre-/partial-stack attributes of the modified data of step S2 considering properties in a visco-elastic or other synthetic model method instead of the field data used in steps S3 and S4. The synthetic or mathematical models can include ray tracing, finite difference, and finite element methods. Although the calculated or identified attributes may be the same as those in steps S3 and S4, other attributes may also be used.

Using the attributes developed in Steps S3 and S4, step S7 generates a statistically significant relationship between these attributes and one or more reservoir properties, producing one or more initial predictions or pseudo-logs at one or more locations where high confidence predictions or measured property data, such as real well logs, are available for some locations but not others. The initial predictions or pseudo logs are then corrected or trained to produce iterative predictions or new pseudo-logs using the measured property data and a statistical method, such as a neuro-net method. An example of an initial and iterative pseudo-log is shown in "Reservoir Architecture and Porosity Distribution,", J. S. Schuelke, et al, Proceedings of Society of Exploration Geophysicists Meeting, Dallas, 1977, pp. 668–671.

Step S8 uses the model generated in Step S2 and the attributes developed in Steps S5 and S6 to generate a predictive relationship between the developed attributes and one or more reservoir properties, such as a relationship used to produce a pseudo-log. The predictive relationship is developed using a statistical method such as a neuro-net method.

In addition to conventional post-stack attributes (e.g., amplitude vs. offset attributes), the embodiment of the inventive method illustrated in FIG. 3 uses pre-stacked seismic data and calculations in conjunction with newly developed pre-stack attributes of the seismic data, e.g., TCM and PCM functions. Other measured and calculated data attributes that may be correlatable to formation properties can include different pre- or partial-stack attributes and their variations with offset (e.g. phase, frequency and wavelet character change with offset) . These data attributes can be calculated directly from the seismic gathers (of a string of sensors) , or a transformation of seismic data to a different domain (e.g., a wavelet domain), and/or a TCM or PCM. Both sets of seismic attributes are used with statistical and synthetic predictive models to reduce uncertainty. For example, a single reservoir property may have multiple effects on different calculated and measured seismic attributes. However, a single attribute among these affected seismic attributes may not fully describe the physical properties that are desired to be quantified. Thus, correlating a multitude of attributes is more likely to contain the necessary information for establishing a statistically significant correlation with any one attribute. Step S9 uses a statistical method (SM) to correlate changes in these one or more attributes derived from the model or field data.

In the embodiment of the inventive method illustrated in FIG. 3, a visco-elastic physical or other synthetic model (PM) is used not only to obtain one of the initial predictions of a reservoir property, but also to generate a pseudo-log at a location where high confidence predictions or data exist. The pseudo-log generator model may be the same or different than the initial PM, but the generator model will typically contain assumed or predicted properties and the accuracy of these assumed or predicted properties can also be improved by using a linear or nonlinear neural-network, fuzzy logic, neuro-fuzzy hybrid, or other iterative statistical methods. The chance of a random variation causing a predictive correlation to one or more seismic attributes is essentially avoided by using a PM, but real (though previously unknown) correlations may be left out using this type of analysis. For example, seismic amplitude (by itself) may account for 80 percent correlation with reservoir porosity. The remaining 20 percent may be correlated to several other attributes. Furthermore, other reservoir properties (e.g., permeability) may have little and/or no linear correlation with seismic amplitudes.

Correlation of the real logs and both sets of property predictions or pseudo logs is accomplished at step S9. In this embodiment, correlation is done by calculating the statistical deviation of the two sets of log predictions or pseudo-logs based on field and model data and creating a single prediction set based on a weighted statistical deviation of the two sets of pseudo-logs. Based on the deviation between the two sets of pseudo logs, modifications to PRP and SRP are made to obtain more reliable reservoir properties.

The final step S10 is a sensitivity analysis. In this embodiment, the sensitivity analysis is performed as follow:

$\Delta PRP = f(SID)$ $\Delta SRP = f(PRP, SID)$ $SID \in ID$ where: SID is defined as any subset of ensemble input data (ID);

$\Delta PRP$ is defined as the deviation of a PRP between the true/measured and predicted values; and $\Delta SRP$ is defined as the deviation of SRP between the true/measured and predicted values.

Figure 5:
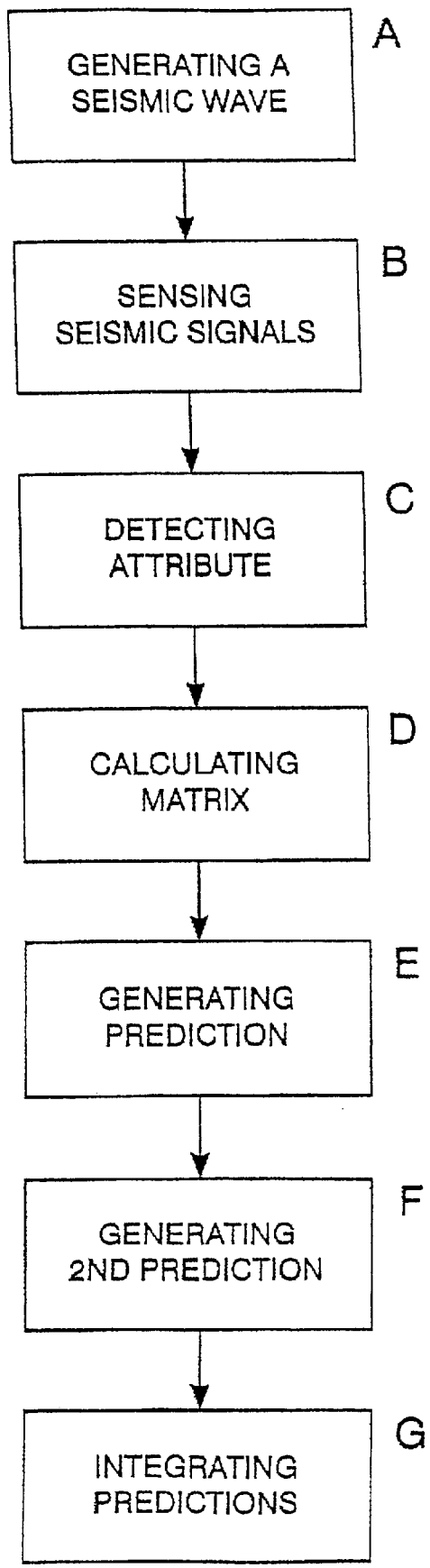
FIG. 5 shows a flow chart.

FIG. 5 shows steps A through G on a flow chart of an embodiment of the inventive method Although a preferred embodiment of the invention has been illustrated in the figures and described, and some alternative embodiments have also been shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A calculating apparatus for predicting an underground reservoir property which comprises:

a signal generator for producing a source signal that is affected by a reservoir property;

a plurality of signal sensors placed at spaced apart locations, wherein said signal sensors produce a succession of signal data that is at least in part dependent upon the location of each signal sensor; and a signal data analyzer that generates a first prediction of said reservoir property using a time cross-correlation matrix function based at least in part on time differences between at least a portion of said succession of signal data.

2. The apparatus of claim 1 wherein said signal data analyzer generates said first prediction also using a power cross-correlation matrix function based at least in part on amplitude differences between a portion of said succession of signal data.

3. The apparatus of claim 2 wherein said first prediction comprises a pseudo-log.

4. The apparatus of claim 3 wherein said pseudo-log includes a second prediction of a secondary reservoir property.

5. The apparatus of claim 4 wherein said second prediction requires measured log data and a statistical method to calculate said second prediction.

6. The apparatus of claim 5 wherein said statistical method comprises a neural network.

7. The apparatus of claim 6 where said signal data analyzer also uses a visco-elastic model to generate said second prediction.

8. The apparatus of claim 7 wherein said signal data analyzer uses a sensitivity analysis method to integrate said first and second predictions to create an updated prediction.

9. The apparatus of claim 8 wherein said updated prediction is based at least in part on weighted first and second predictions.

10. A process for predicting a reservoir property at a reservoir location using an attribute of a seismic signal, said process comprising:

generating a seismic wave having said attribute using a generator;

sensing a plurality of seismic signals using a plurality of sensors spaced apart from said generator;

detecting said attribute in said seismic signals;

calculating a first cross-correlation matrix using said seismic signals wherein said cross-correlation matrix is a time cross-correlation matrix; and generating a first prediction of said property at said reservoir location based at least in part on said cross-correlation matrix.

11. The process of claim 10 which also comprises the steps of:

calculating a second cross-correlation matrix based at least in part on said seismic signals;

generating a second prediction of said property at said reservoir location based at least in part on said second cross-correlation matrix; and correlating said first and second predictions.

12. The process of claim 11 wherein said correlating step uses a neural network method.

13. The process of claim 12 wherein said correlating step also uses a visco-elastic model.

14. The process of claim 13 wherein said correlating step comprises a sensitivity analysis method applied to said first and second predictions.

15. A process for predicting a property at an underground location using at least one attribute of a seismic signal, said process comprising:

generating a seismic wave having said attribute using a generator;

sensing a succession of seismic signals using a plurality of sensors spaced apart from said generator; and generating a prediction of said property at said reservoir location based at least in part on said attribute, said succession of seismic signals, a statistical method, and well log data.

16. The process of claim 15 wherein said underground location is more than about 15,000 feet deep.

17. A process for predicting a property at an underground location using a seismic source and a plurality of seismic sensors, said process comprising:

generating a seismic wave using said seismic source;

sensing a succession of seismic signals using said plurality of seismic sensors; and generating a prediction of said property at said underground location based at least in part on said succession of seismic signals, a statistical method, and well log data, wherein said succession of seismic signals are pre stack data.

18. A process for predicting a property at an underground location using a seismic generator and a plurality of seismic sensors, said process comprising:

generating a seismic disturbance using said seismic generator;

sensing a succession of seismic signals using said plurality of seismic sensors;

generating a first prediction of said property at said underground location based at least in part on a time cross-correlation matrix function of said seismic signals and a first method;

generating a second prediction of said property at said underground location based at least in part on said seismic signals and a second method, wherein said first prediction is significantly different from said second prediction; and generating an integrated prediction of said property at said underground location based at least in part on a weighted correlation of said first and second predictions.

19. A process for predicting a property of matter at a location which uses an attribute of a succession of indirect indicators of said property, said process comprising:

producing a plurality of indirect indicators;

generating a first prediction of said property at said location based at least in part on a time cross-correlation matrix function and an attribute of one of said indirect indicators;

generating a second prediction of said property at said location based at least in part on an attribute of one of said indirect indicators, wherein said first prediction is significantly different from said second prediction; and generating an integrated prediction of said property at said location based at least in part on a weighted correlation of said first and second predictions.

* * * * *

UNITED STATES PATENT AND TRADEMARK OFFICE
CERTIFICATE OF CORRECTION

PATENT NO. : 6,236,943 B1
DATED : May 22, 2001
INVENTOR(S) : Fred Aminzadeh et al.

It is certified that error appears in the above-identified patent and that said Letters Patent is hereby corrected as shown below:

Title page,
OTHER PUBLICATIONS, first reference, "Geoexpoaration" should read -- Geoexploration --.
Eighth reference, "Spacing" should read -- Space --.
Ninth reference "pp. 2301-2050" should read -- 2031-2050 --.

Signed and Sealed this

Fifteenth Day of January, 2002

Attest:

JAMES E. ROGAN
*Director of the United States Patent and Trademark Office*

*Attesting Officer*